United States Patent
Imazu et al.

(10) Patent No.: US 9,966,778 B2
(45) Date of Patent: May 8, 2018

(54) ELECTRONIC APPARATUS AND METHOD

(71) Applicant: CANON KABUSHIKI KAISHA, Tokyo (JP)

(72) Inventors: Hiroo Imazu, Tokyo (JP); Yasusaburo Degura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 14/959,297

(22) Filed: Dec. 4, 2015

(65) Prior Publication Data
US 2016/0164330 A1    Jun. 9, 2016

(30) Foreign Application Priority Data
Dec. 5, 2014  (JP) ................. 2014-247440

(51) Int. Cl.
*H02J 9/00* (2006.01)
*H02J 7/00* (2006.01)

(52) U.S. Cl.
CPC .......... *H02J 7/0068* (2013.01); *H02J 7/0063* (2013.01)

(58) Field of Classification Search
None
See application file for complete search history.

(56) References Cited

U.S. PATENT DOCUMENTS 7,288,857 B2 * 10/2007 Bartholomew ......... H02J 9/061
                                                              307/140
2015/0362936 A1 * 12/2015 Patel ..................... G05F 1/575
                                                              323/280

FOREIGN PATENT DOCUMENTS

JP       2013-059206 A     3/2013

* cited by examiner

*Primary Examiner* — Long Nguyen
(74) *Attorney, Agent, or Firm* — Cowan, Liebowitz & Latman, P.C.

(57) ABSTRACT

An electronic apparatus includes a first switch unit being connected between an electrical load and a battery, a second switch unit being connected between the electrical load and the battery, and being connected in parallel with the first switch unit, a first control unit that controls the first switch unit so as to control supplying power from an external apparatus to the electrical load and charging the battery with power supplied from the external apparatus to the electronic apparatus, and a second control unit that controls the second switch unit based on whether power is supplied from the external apparatus to the electronic apparatus. In a case where power is not supplied from the external apparatus to the electronic apparatus, the second control unit controls the second switch unit to supply power from the battery to the electrical load via the second switch unit.

30 Claims, 15 Drawing Sheets

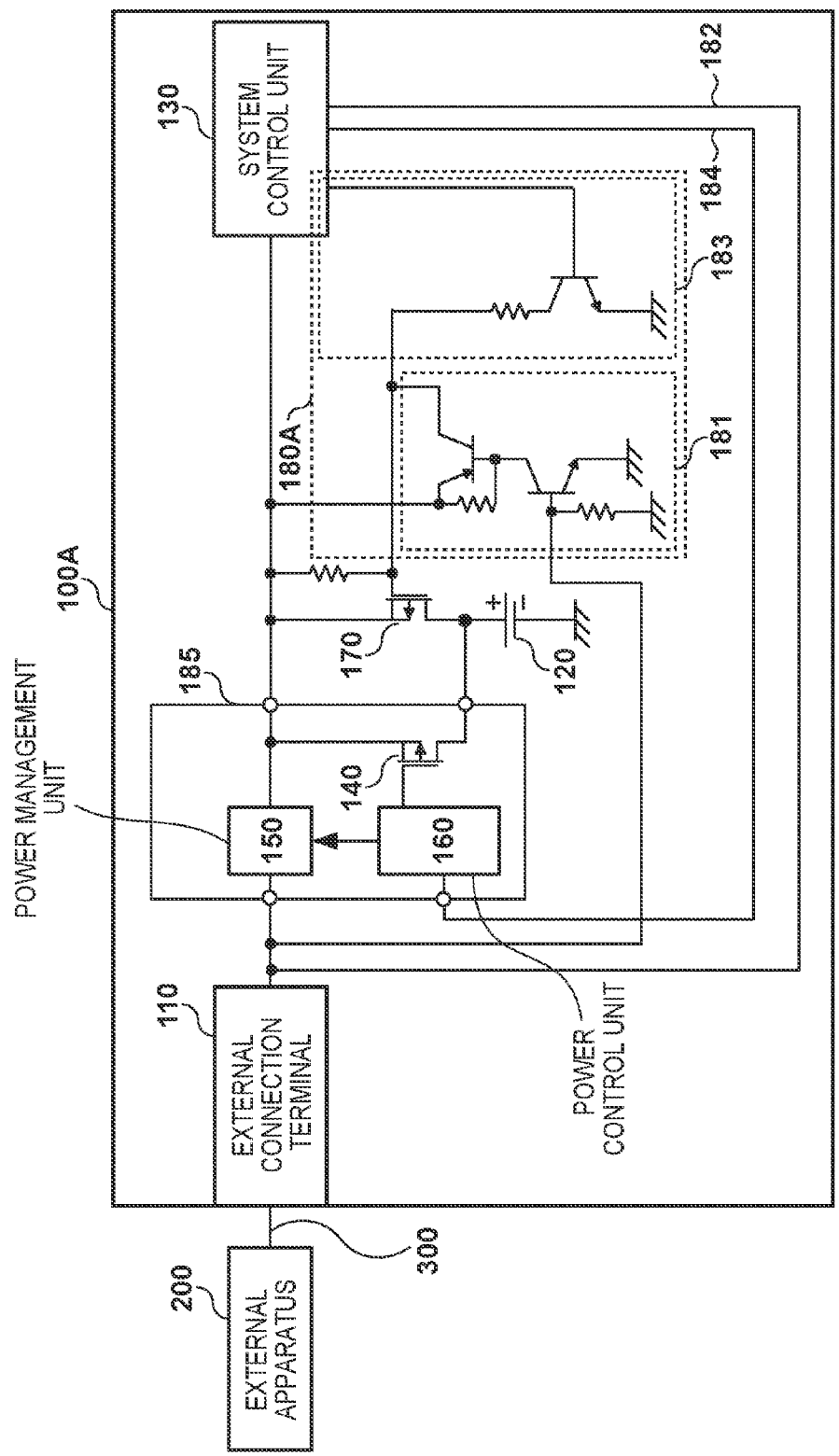

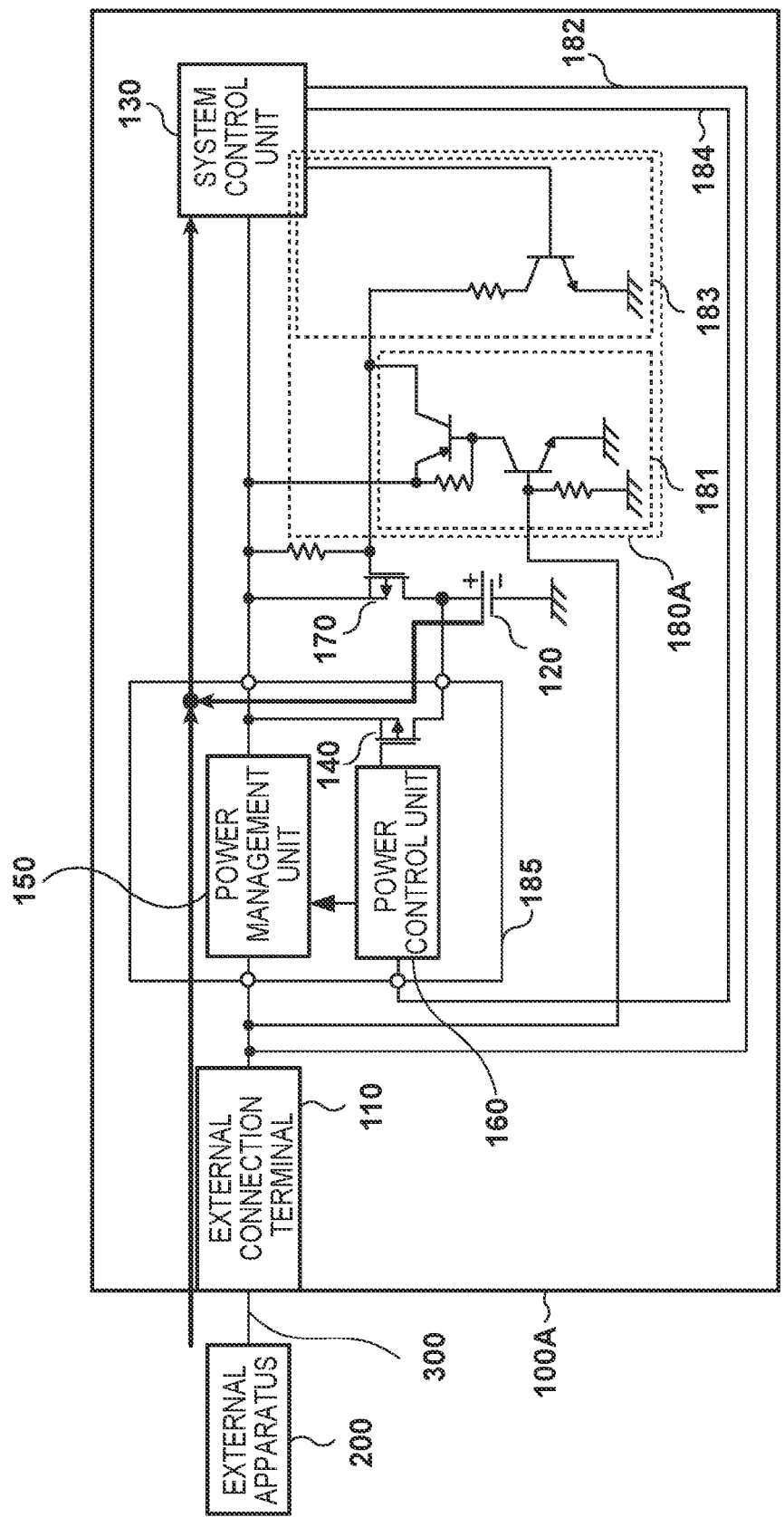
F I G. 2B

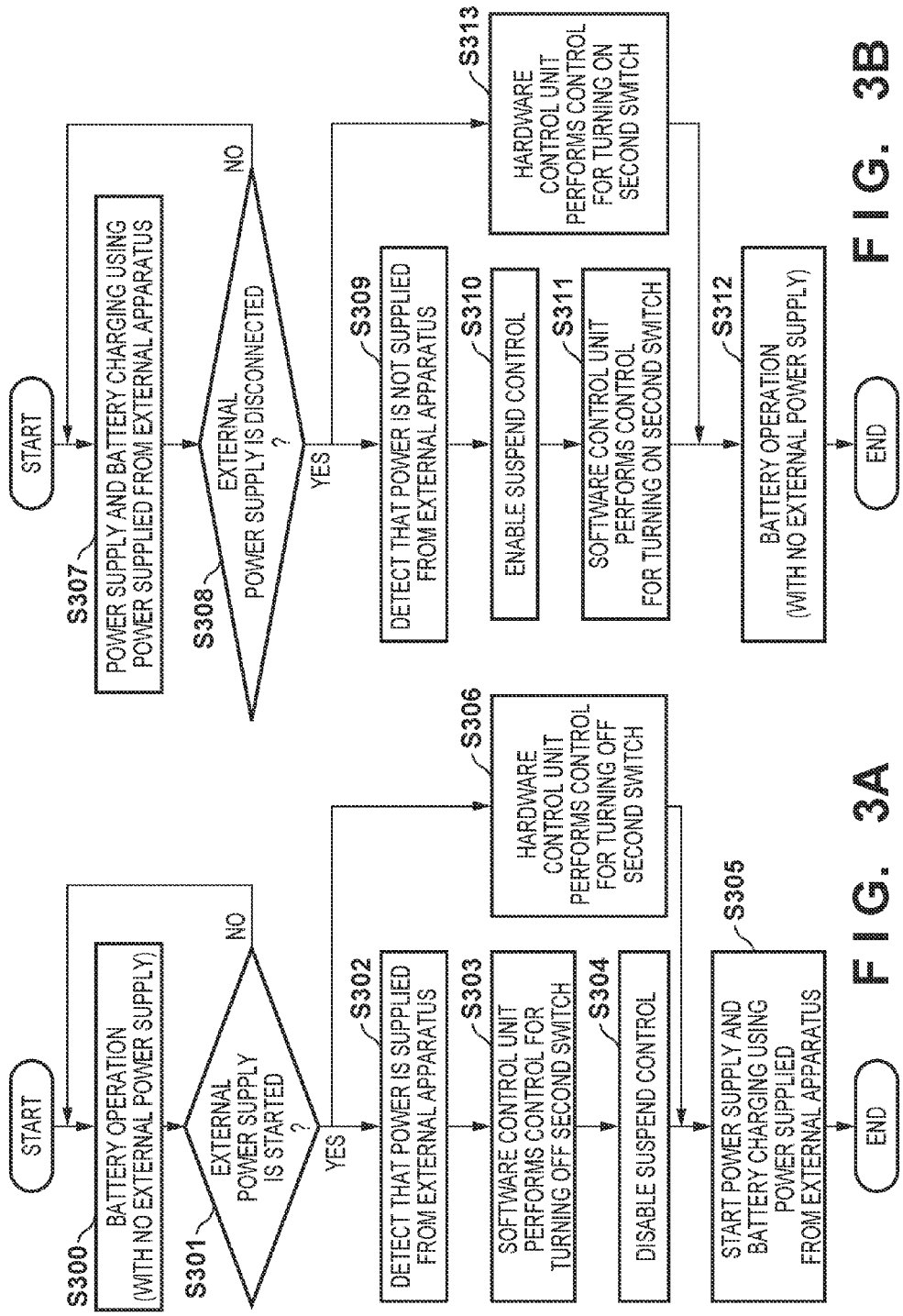
FIG. 3A / FIG. 3B

FIG. 4

|  |  | HARDWARE CONTROL UNIT | |
|---|---|---|---|
|  |  | ON | OFF |
| SOFTWARE CONTROL UNIT | ON | ON | OFF |
|  | OFF | OFF | OFF |

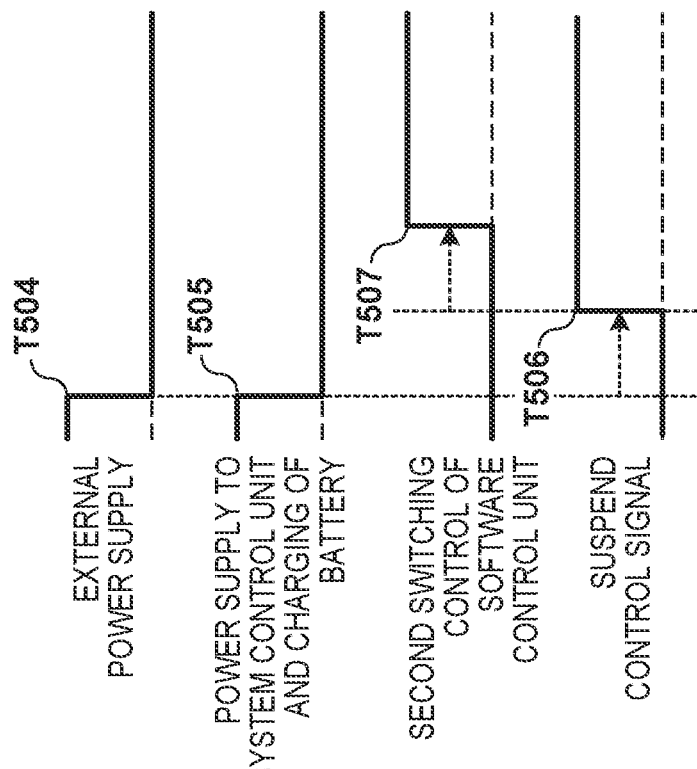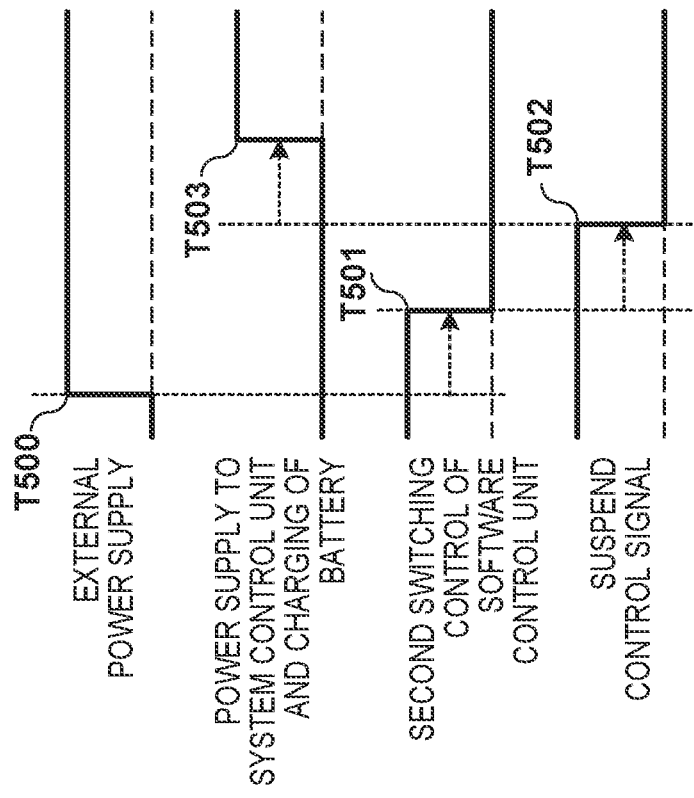

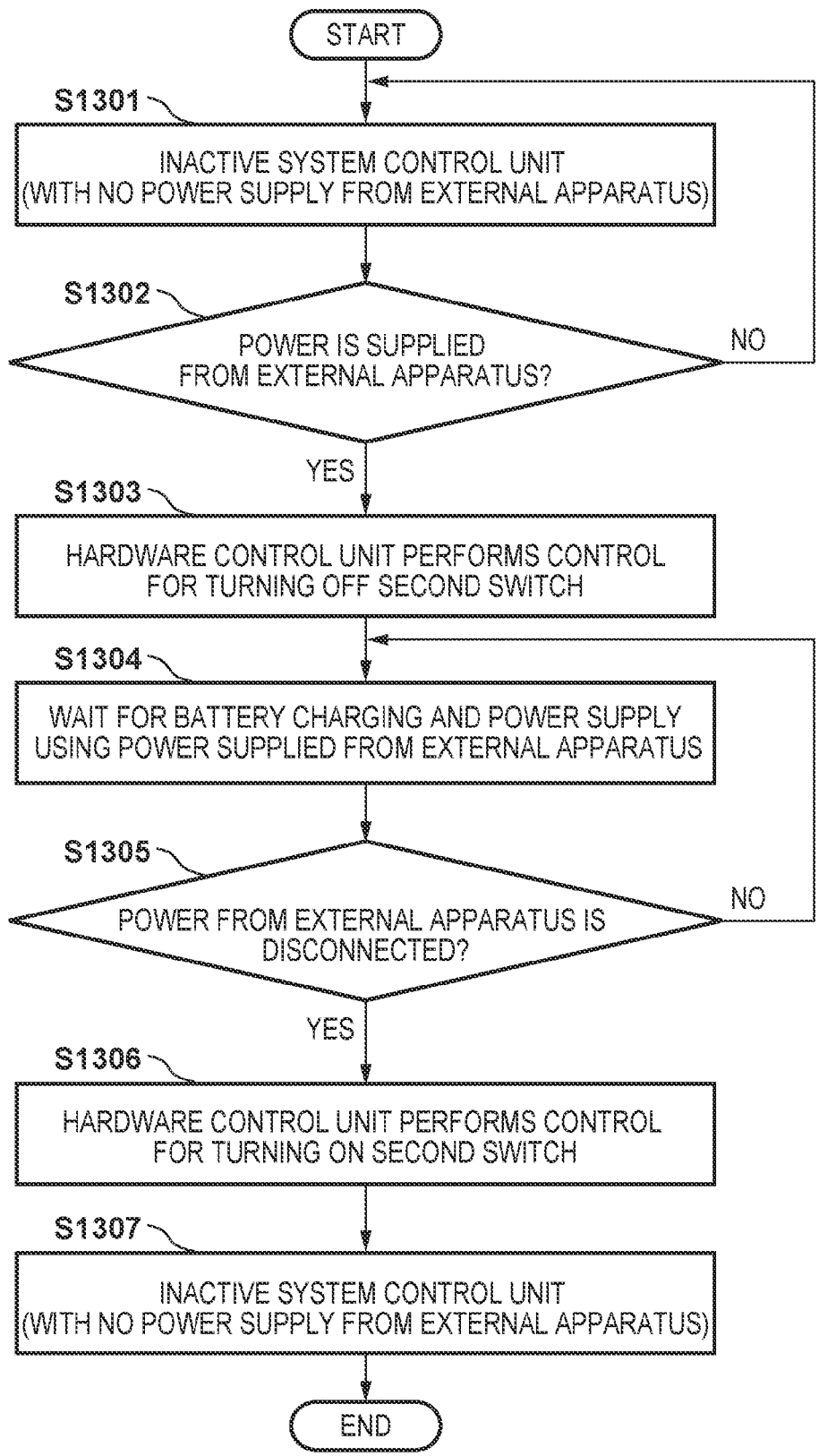

ELECTRONIC APPARATUS AND METHOD

BACKGROUND

Field of the Invention

The present invention relates to an electronic apparatus and method that are capable of supplying power to a control unit and charging a battery using power supplied from an external apparatus.

Description of the Related Art

A system that supplies power supplied from an external apparatus to a system load (corresponding to an electrical load of a system) and a battery is known (Japanese Patent Laid-Open No. 2013-59206).

Incidentally, in Japanese Patent Laid-Open No. 2013-59206, in a case where in a battery-operated state (a state where the system load operates with power supply from the battery), a disadvantage is conceivable that the voltage supplied to the system load decreases due to the influence of a switch circuit connected between the system load and the battery. In addition, in the battery-operated state, another disadvantage is also conceivable that power loss occurs due to the switch circuit connected between the system load and the battery.

However, these disadvantages are not considered in Japanese Patent Laid-Open No. 2013-59206. Consider the case where the switch circuit includes a MOSFET (metal-oxide-semiconductor field-effect transistor), for example. In this case, if the battery-operated state is started when power is not supplied from an external apparatus and then a large current flows through the switch circuit, on-resistance occurs between a drain and a source, and a decrease in the voltage supplied to the system load and power loss due to the switch circuit occur. As a result, operations of the system load may possibly become instable, and the remaining capacity and the operable time of the battery decrease. In particular, in a case where the battery voltage is low, the on-resistance further increases since the gate voltage decreases. As a result, the voltage supplied to the system load further decreases, and power loss due to the switch circuit further increases. In this case as well, operations of the system load may possibly become instable, and the remaining capacity and the operable time of the battery decrease.

SUMMARY

According to an aspect of the present invention, there is provided an apparatus and method capable of suppressing an increase in on-resistance of a switch circuit connected between an electrical load of a system (e.g., a system load) and a battery.

According to an aspect of the present invention, there is provided an electronic apparatus comprising: a first switch unit configured to be connected between an electrical load and a battery; a second switch unit configured to be connected between the electrical load and the battery, and configured to be connected in parallel with the first switch unit; a first control unit configured to control the first switch unit so as to control supplying power from an external apparatus to the electrical load and charging the battery with power supplied from the external apparatus to the electronic apparatus; and a second control unit configured to control the second switch unit based on whether power is supplied from the external apparatus to the electronic apparatus, wherein in a case where power is not supplied from the external apparatus to the electronic apparatus, the second control unit controls the second switch unit to supply power from the battery to the electrical load via the second switch unit.

According to an aspect of the present invention, there is provided a method comprising: controlling a first switch unit so as to control supplying power from an external apparatus to a electrical load in an electronic apparatus and charging a battery with power supplied from the external apparatus to the electronic apparatus, the first switch unit being configured to be connected between the electrical load and the battery; and controlling a second switch unit based on whether power is supplied from the external apparatus to the electronic apparatus, the second switch unit being configured to be connected between the electrical load and the battery, and configured to be connected in parallel with the first switch unit, wherein in a case where power is not supplied from the external apparatus to the electronic apparatus, the second switch unit is controlled to supply power from the battery to the electrical load via the second switch unit.

According to an aspect of the present invention, there is provided an non-transitory storage medium that stores a program for causing a computer to execute a method, the method comprising: controlling a first switch unit so as to control supplying power from an external apparatus to a electrical load in an electronic apparatus and charging a battery with power supplied from the external apparatus to the electronic apparatus, the first switch unit being configured to be connected between the electrical load and the battery; and controlling a second switch unit based on whether power is supplied from the external apparatus to the electronic apparatus, the second switch unit being configured to be connected between the electrical load and the battery, and configured to be connected in parallel with the first switch unit, wherein in a case where power is not supplied from the external apparatus to the electronic apparatus, the second switch unit is controlled to supply power from the battery to the electrical load via the second switch unit.

Further features and aspects of the present invention will become apparent from the following description of exemplary embodiments.

BRIEF DESCRIPTION OF THE DRAWINGS

FIG. 1 is a block diagram for illustrating an exemplary configuration of an electronic apparatus 100A according to a first embodiment.

FIGS. 2A to 2C are diagrams for illustrating an exemplary method for controlling supplying power to a system control unit 130 and charging a battery 120.

FIGS. 3A and 3B are flowcharts for illustrating processes performed in the electronic apparatus 100A according to the first embodiment.

FIG. 4 is a diagram for illustrating an exemplary method for controlling a second switch circuit 170.

FIGS. 5A and 5B are timing charts for illustrating an exemplary relationship between control performed by a software control unit 183 and a suspend control signal 184.

FIG. 13 is a flowchart for illustrating a process performed in the electronic apparatus 100E according to the fifth embodiment.

DESCRIPTION OF THE EMBODIMENTS

Figure 2A:
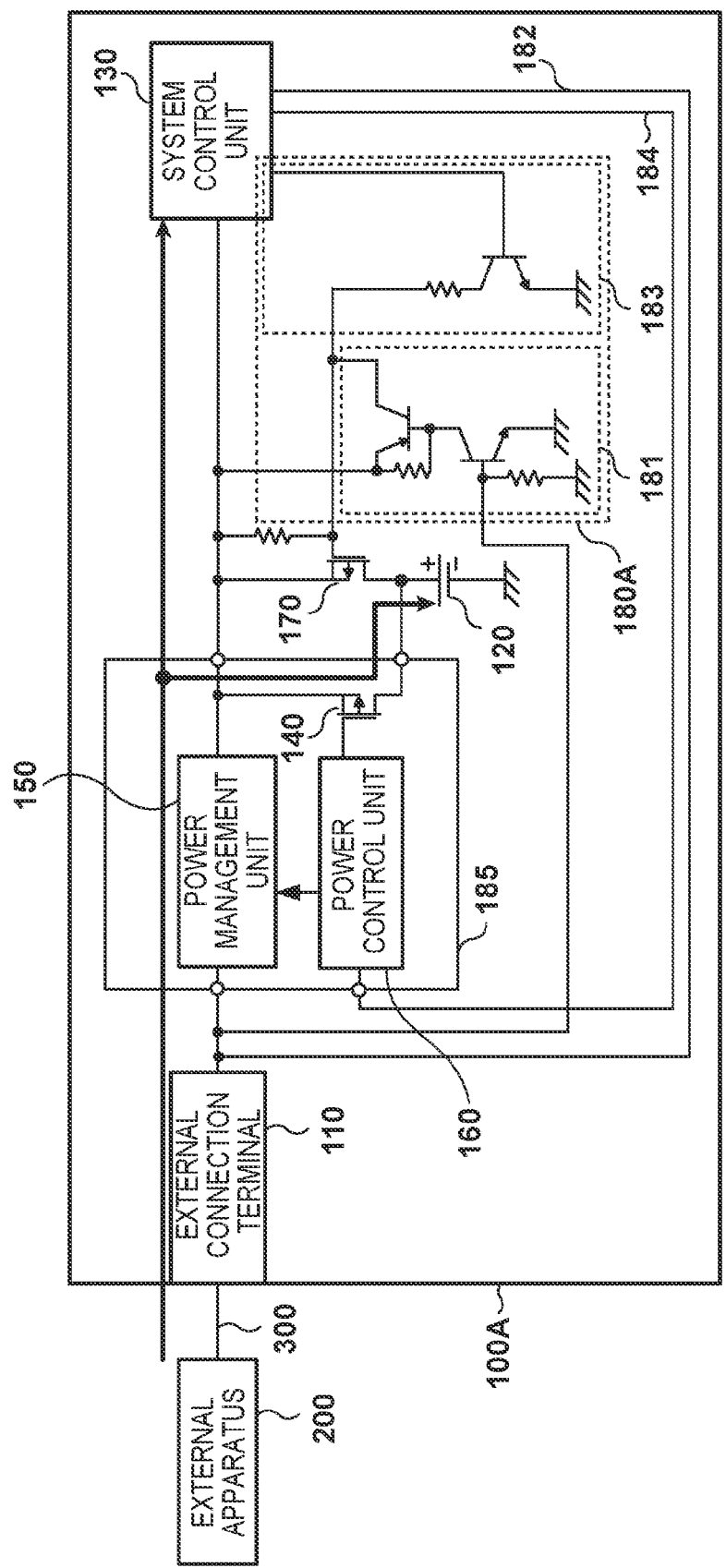

Exemplary embodiments, features, and aspects of the present invention will be described below with reference to the drawings.

First Embodiment

FIG. 1 is a block diagram for illustrating an exemplary configuration of an electronic apparatus 100A according to a first embodiment.

The electronic apparatus 100A includes an external connection terminal 110, a charge control unit 185, a system control unit 130, a second switch circuit 170, a battery 120, and a second switch control unit 180A. The electronic apparatus 100A may be an apparatus that has a built-in battery 120, or the electronic apparatus 100A may be an apparatus from which the battery 120 can be removed. The electronic apparatus 100A is an apparatus capable of acting as an image capture apparatus, a mobile device, or a display apparatus, for example. Here, the image capture apparatus includes an apparatus capable of acting as a digital camera or a scanner. The mobile device includes an apparatus capable of acting as a mobile phone. Note that at least one of the components of the electronic apparatus 100A have a hardware configuration.

The external apparatus 200 is a power supply apparatus capable of supplying power to the electronic apparatus 100A. The external apparatus 200 is an apparatus capable of acting as a personal computer, for example. The external apparatus 200 is an apparatus capable of acting as a power source apparatus capable of converting alternating-current power to direct-current power, for example.

A connection cable 300 is a cable that can connect the electronic apparatus 100A to the external apparatus 200. The connection cable 300 includes, for example, a USB (Universal Serial Bus) cable, an HDMI (High-Definition Multimedia Interface) cable, or the like.

An external connection terminal 110 is an interface having a data and power transfer function for connection to the external apparatus 200 via the cable 300. The external connection terminal 110 includes an USB interface connector, an HDMI interface connector, or the like, for example. Note that the external connection terminal 110 may be an interface having only a power transfer function.

The charge control unit 185 includes a first switch circuit 140, a power management unit 150, a power control unit 160, and the like, and includes a semiconductor integrated circuit.

The first switch circuit 140 is provided in the semiconductor integrated circuit, and includes a MOSFET (metal-oxide-semiconductor field-effect transistor) or the like. The first switch circuit 140 is connected between the system control unit 130 and the battery 120, and is controlled by the power control unit 160.

The power management unit 150 includes a current limiter circuit and a regulator, or the like. The power management unit 150 is controlled by a power control unit 160, and limits the current flowing from the external apparatus 200 to the electronic apparatus 100A and converts the voltage in the external apparatus 200 to the voltage in the electronic apparatus 100A. Furthermore, the power management unit 150 controls a current limitation, a voltage conversion, and enabling or disabling a suspend control, and the like, by being controlled by the power control unit 160.

The power control unit 160 controls the first switch circuit 140 to turn on or off the first switch circuit 140, based on whether or not power is supplied from the external apparatus 200 to the electronic apparatus 100A. The power control unit 160 can also perform suspend control for the power management unit 150 by using a suspend control signal 184 from the system control unit 130, and can stop supplying power to the system control unit 130 and charging the battery 120. For example, upon the suspend control being performed for the power management unit 150, the current limiter circuit cuts off the current, and the regulator stops its operation.

The system control unit 130 is a controller for controlling the electronic apparatus 100A, and includes a CPU (Central Processing Unit) or the like. The system control unit 130 can detect whether or not power is supplied from the external apparatus 200 to the electronic apparatus 100A based on a signal level at an input port to which an external power detection signal 182 is input. The system control unit 130 can perform suspend control for stopping supplying power to the system control unit 130 from the external connection terminal 110 and charging the battery 120, by switching the output of the suspend control signal 184.

The second switch circuit 170 is a switch circuit that includes a MOSFET or the like, and is connected between the system control unit 130 and the battery 120 in parallel with the first switch circuit 140. Although the first embodiment describes the case where the second switch circuit 170 includes a MOSFET, the first embodiment is not limited thereto. The second switch circuit 170 may include a bipolar transistor, an analog switch IC, or the like, for example.

The battery 120 is a secondary battery capable of being charged, such as a lithium-ion battery. The battery 120 has at least one battery cell.

The second switch control unit 180A includes a hardware control unit 181 and a software control unit 183. The second switch control unit 180A performs control for turning on the second switch circuit 170 in a case where both the hardware control unit 181 and the software control unit 183 turn on the second switch circuit 170. A state where the second switch circuit 170 is on refers to a state where the second switch circuit 170 is conductive (i.e., conductive state). A state where the second switch circuit 170 is off refers to a state where the second switch circuit 170 is not conductive (i.e., non-conductive state).

The hardware control unit 181 is a circuit that includes a bipolar transistor or the like, operates using externally supplied power, and performs control for turning on or off the second switch circuit 170. Although the first embodiment describes the case where the hardware control unit 181 includes a bipolar transistor, the first embodiment is not limited thereto. The hardware control unit 181 may include a MOSFET, a logic IC, or the like, for example.

The software control unit 183 is a circuit that includes a bipolar transistor or the like, and is controlled by the system control unit 130 so as to turn on or off the second switch circuit 170 based on whether or not external power is supplied. Although the first embodiment describes the case where the software control unit 183 includes a bipolar transistor, the first embodiment is not limited thereto. The software control unit 183 may include a MOSFET or the like, for example, or a configuration may be employed in which the system control unit 130 directly controls the second switch circuit 170.

Next, processes performed in the electronic apparatus 100A according to the first embodiment will be described with reference to FIGS. 3A and 3B. FIG. 3A is a flowchart for illustrating a process performed in the electronic apparatus 100A in a case where supplying power from the external apparatus 200 to the electronic apparatus 100A is started. FIG. 3B is a flowchart for illustrating a process performed in the electronic apparatus 100A in a case where the supply of power from the external apparatus 200 to the electronic apparatus 100A is disconnected.

First, a description will be given, with reference to FIG. 3A, of a process performed in the electronic apparatus 100A in a case where supplying power from the external apparatus 200 to the electronic apparatus 100A is started.

In step S300, the electronic apparatus 100A enters a battery-operated state when the electronic apparatus 100A is in a state where power is not supplied from the external apparatus 200. Here, the battery-operated state refers to a state where the system control unit 130 can operate with power supplied from the battery 120.

In step S301, if power is supplied from the external apparatus 200 to the electronic apparatus 100A, the process proceeds to steps S302 and S306. If, in step S301, power is not supplied from the external apparatus 200 to the electronic apparatus 100A, the process returns to step S300, and steps S300 and S301 are repeated until supplying power from the external apparatus 200 to the electronic apparatus 100A is started.

Here, process in steps S302 to S304 and process in step S306 are performed in parallel, and then the process proceeds to step S305. If off-control is performed in the earlier of steps S303 and S306, the second switch circuit 170 is controlled so as to be turned off.

In step S302, the system control unit 130 detects, by using the external power detection signal 182, that power is supplied from the external apparatus 200 to the electronic apparatus 100A.

In step S303, the system control unit 130 controls the software control unit 183 so as to turn off the second switch circuit 170. In the first embodiment, if a signal from the system control unit 130 is at a logical-low level, the software control unit 183 turns off the second switch circuit 170.

In step S304, the system control unit 130 disables the suspend control for the power management unit 150 by using the suspend control signal 184. In the first embodiment, if the signal from the system control unit 130 is at a logical-low level, the power management unit 150 supplies power from the external connection terminal 110 to the system control unit 130 and charges the battery 120.

In step S306, the hardware control unit 181 performs control for turning off the second switch circuit 170 since power is supplied from the external apparatus 200 to the electronic apparatus 100A.

In step S305, supplying power to the system control unit 130 and charging the battery 120 are started as a result of power being supplied from the external apparatus 200 to the electronic apparatus 100A.

Next, a description will be given, with reference to FIG. 3B, of a process performed in the electronic apparatus 100A in a case where the supply of power from the external apparatus 200 to the electronic apparatus 100A is disconnected.

In step S307, the electronic apparatus 100A is in a state where power is supplied to the system control unit 130 and the battery 120 is charged as a result of power being supplied from the external apparatus 200.

In step S308, if the supply of power from the external apparatus 200 to the electronic apparatus 100A is disconnected, the process proceeds to steps S309 and S313. If, in step S308, power is supplied from the external apparatus 200 to the electronic apparatus 100A, the process returns to step S307, and steps S307 and S308 are repeated until the supply of power from the external apparatus 200 to the electronic apparatus 100A is disconnected.

Here, process in steps S309 to S311 and process in step S313 are performed in parallel, and then the process proceeds to step S312. In a case where control for turning on the second switch circuit 170 is performed in both steps S311 and S313, the second switch circuit 170 turns on.

In step S309, the system control unit 130 detects, by using the external power detection signal 182, that power is not supplied from the external apparatus 200 to the electronic apparatus 100A.

In step S310, the system control unit 130 enables the suspend control for the power management unit 150 by using the suspend control signal 184, and stops supplying power to the system control unit 130 and charging the battery 120. In the first embodiment, if the signal from the system control unit 130 is at a logical-high level, the power management unit 150 stops supplying power from the external connection terminal 110 to the system control unit 130 and charging the battery 120.

In step S311, the system control unit 130 controls the software control unit 183 so as to turn on the second switch circuit 170. In the first embodiment, if a signal from the system control unit 130 is at a logical-high level, the software control unit 183 turns on the second switch circuit 170.

In step S313, the hardware control unit 181 performs control for turning on the second switch circuit 170 since power is not supplied from the external apparatus 200 to the electronic apparatus 100A.

In step S312, the electronic apparatus 100A enters the battery-operated state when the electronic apparatus 100A is in a state where power is not supplied from the external apparatus 200.

Here, the logic of the signal from the system control unit 130 is an example, and the first embodiment is not limited thereto. For example, the condition in a case where the signal is at a logical-high level and the condition in a case where the signal is at a logical-low level may be inverted.

FIG. 4 is a diagram for illustrating how the second switch circuit 170 is turned on or off by the hardware control unit 181 and the software control unit 183. The second switch circuit 170 turns on in a case where both the hardware control unit 181 and the software control unit 183 perform control for turning on the second switch circuit 170, and the second switch circuit 170 turns off in a case where other control is performed. This control is performed in order to prevent the second switch circuit 170 from turning on at a timing other than a desired timing in a case where either the hardware control unit 181 or the software control unit 183 delays or malfunctions.

FIGS. 5A and 5B are timing charts for illustrating an exemplary relationship between the control performed by the software control unit 183 and the suspend control signal 184. FIG. 5A is a timing chart illustrating an exemplary relationship between the control of the software control unit 183 and the suspend control signal 184 in a case where power supply from the external apparatus 200 to the electronic apparatus 100A is started. FIG. 5B is a timing chart illustrating an exemplary relationship between the control of the software control unit 183 and the suspend control signal 184 in a case where the supply of power from the external apparatus 200 to the electronic apparatus 100A is disconnected.

First, a description will be given, with reference to FIG. 5A, of the case where power supply from the external apparatus 200 to the electronic apparatus 100A is started.

At T500, power supply from the external apparatus 200 to the electronic apparatus 100A is started. The system control unit 130 detects, by using the external power detection signal 182, that supplying power from the external apparatus 200 to the electronic apparatus 100A is started. Then, at T501, the signal from the system control unit 130 is set at the low level, and the software control unit 183 thereby performs control for turning off the second switch circuit 170. Thereafter, at T502, the system control unit 130 thereby cancels (disables) the suspend control for the power management unit 150 by setting the suspend control signal 184 at the low level. As a result of the suspend control being canceled, at T503, supplying power to the system control unit 130 and charging the battery 120 are started.

The suspend control is canceled at T502 because there is a possibility that supplying power from the external apparatus 200 to the electronic apparatus 100A and charging the battery 120 are started before the second switch circuit 170 turns off at T501.

Next, a description will be given, with reference to FIG. 5B, of the case where the supply of power from the external apparatus 200 to the electronic apparatus 100A is disconnected.

At T504, the supply of power from the external apparatus 200 to the electronic apparatus 100A is disconnected, and the system control unit 130 detects, by using the external power detection signal 182, that the supply of power from the external apparatus 200 to the electronic apparatus 100A is disconnected. At T505, which is the same timing as T504, supplying power to the system control unit 130 and charging the battery 120 stop. At T506, the system control unit 130 thereby enables the suspend control for the power management unit 150 by setting the suspend control signal 184 at the high level. Thereafter, at T507, the signal from the system control unit 130 is set at the high level, and the software control unit 183 thereby performs control for turning on the second switch circuit 170.

Figure 2C:
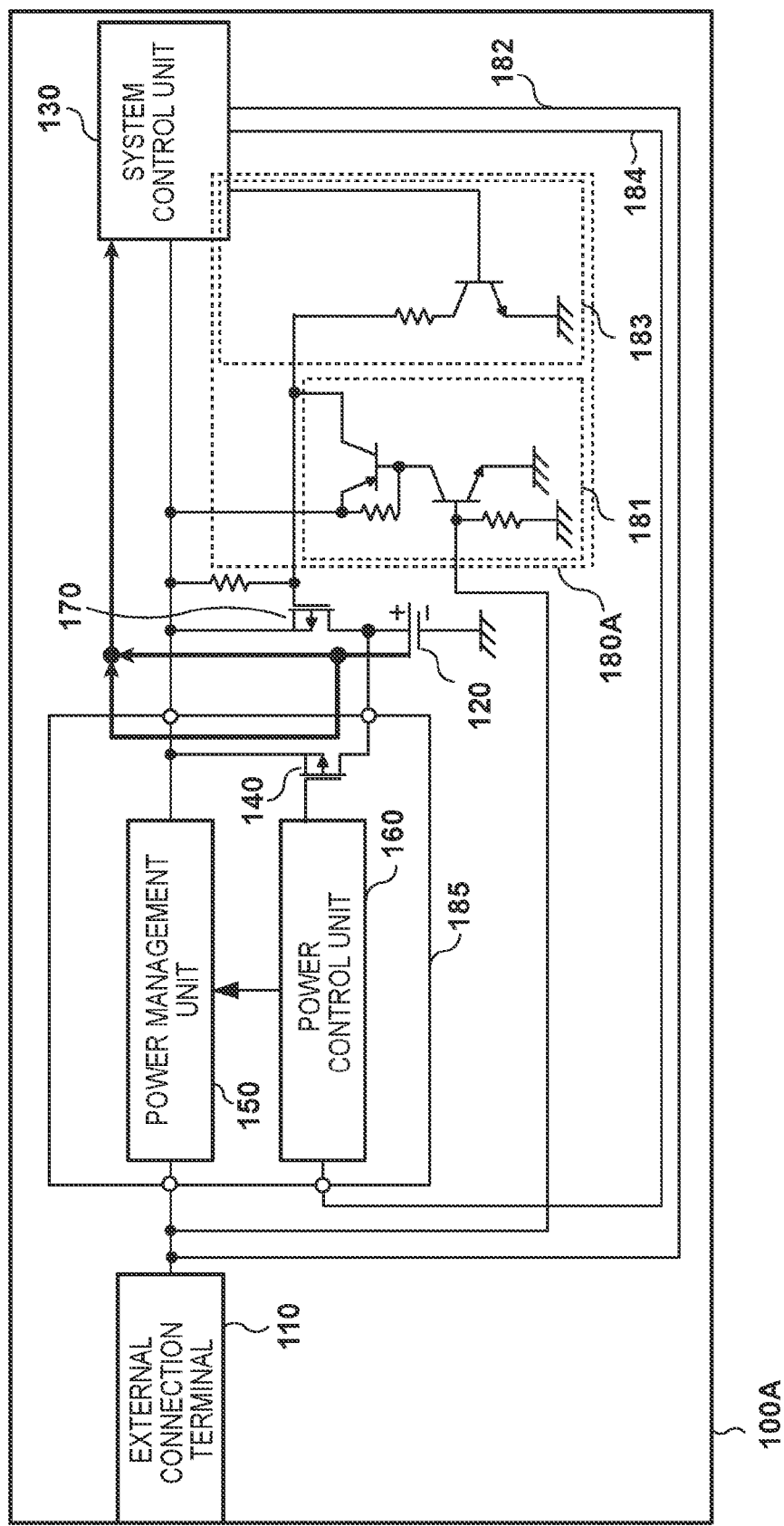

FIGS. 2A, 2B, and 2C are diagrams for illustrating an exemplary method for controlling supplying power to the system control unit 130 and charging the battery 120. FIGS. 2A and 2B are diagrams for illustrating processes performed in the electronic apparatus 100A in a case where power is supplied from the external apparatus 200 to the electronic apparatus 100A. FIG. 2C is a diagram for illustrating a process performed in the electronic apparatus 100A in a case where power is not supplied from the external apparatus 200 to the electronic apparatus 100A.

First, a description will be given, with reference to FIGS. 2A and 2B, of processes performed in the electronic apparatus 100A in a case where power is supplied from the external apparatus 200 to the electronic apparatus 100A.

In FIG. 2A, power is supplied from the external apparatus 200 to the external connection terminal 110 via the cable 300. As a result of power being supplied, the hardware control unit 181 and the software control unit 183 perform control for turning off the second switch circuit 170. The details of the control of the second switch circuit 170 are as described with reference to FIGS. 3A and 3B.

The supplied power is input to the power management unit 150. In the power management unit 150, the current limitation, the voltage conversion, and enabling or disabling the suspend control, and the like are performed by being controlled by the power control unit 160.

Thereafter, power output from the power management unit 150 is supplied to the system control unit 130 and also used for charging the battery 120 via the first switch circuit 140.

In this case, the second switch circuit 170 is controlled so as to be turned off by the hardware control unit 181 and the software control unit 183, and enters the non-conductive state. Here, charging the battery 120 is managed by the power control unit 160 via the first switch circuit 140, and accordingly, the second switch circuit 170 is in the non-conductive state.

Furthermore, the first switch circuit 140 is subjected to linear control by the power control unit 160 so as to obtain a charging voltage and a charging current that are suitable for the battery 120. For example, if the battery 120 is a lithium-ion battery, the control is performed so as to achieve CCCV (Constant Voltage Constant Current) charging.

In a case where power consumption in the system control unit 130 increases and power supplied from the external apparatus 200 to the electronic apparatus 100A is insufficient, the supply voltage of the power management unit 150 decreases and the voltage of the battery 120 becomes higher. For this reason, as shown in FIG. 2B, control is performed by the power control unit 160 so as to stop charging the battery 120 and supply lacking power from the battery 120 to the system control unit 130 via the first switch circuit 140.

Next, a description will be given, with reference to FIG. 2C, of a process performed in the electronic apparatus 100A in a case where power is not supplied from the external apparatus 200 to the electronic apparatus 100A.

In FIG. 2C, the external apparatus 200 is not connected, and power is not supplied to the external connection terminal 110. Here, the following description also applies to the case where the external apparatus 200 is connected but power is not supplied therefrom.

Since power is not supplied, the hardware control unit 181 and the software control unit 183 perform control for turning on the second switch circuit 170. The details of the control of the second switch circuit 170 are as described with reference to FIGS. 3A and 3B. In addition, since power is not supplied from the external apparatus 200 to the electronic apparatus 100A, power is supplied from the battery 120 to the system control unit 130 via the first switch circuit 140 and the second switch circuit 170. In this case, the second switch circuit 170 is controlled so as to be turned on by the hardware control unit 181 and the software control unit 183, and is in an on state.

Here, by supplying power via the second switch circuit 170 as well as the first switch circuit 140, the on-resistance of the first switch circuit 140 and power loss such as a voltage drop can be reduced.

Thus, according to the first embodiment, an increase in the on-resistance of the first switch circuit 140 can be suppressed in a case where power is not supplied from the external apparatus 200 to the electronic apparatus 100A and the electronic apparatus 100A is in the battery-operated state. It is thereby possible to reduce a decrease in the voltage supplied to an electrical load of a system (e.g., the system control unit 130) and power loss due to the first switch circuit 140. It is also possible to reduce the possibility that operations of an electrical load of a system (e.g., the system control unit 130) become instable, and to reduce a decrease in the remaining capacity and the operable time of the battery 120.

Second Embodiment

Next, a second embodiment will be described. In the second embodiment, a difference from the first embodiment will be described, and descriptions of features similar to those of the first embodiment will be omitted.

Figure 6:
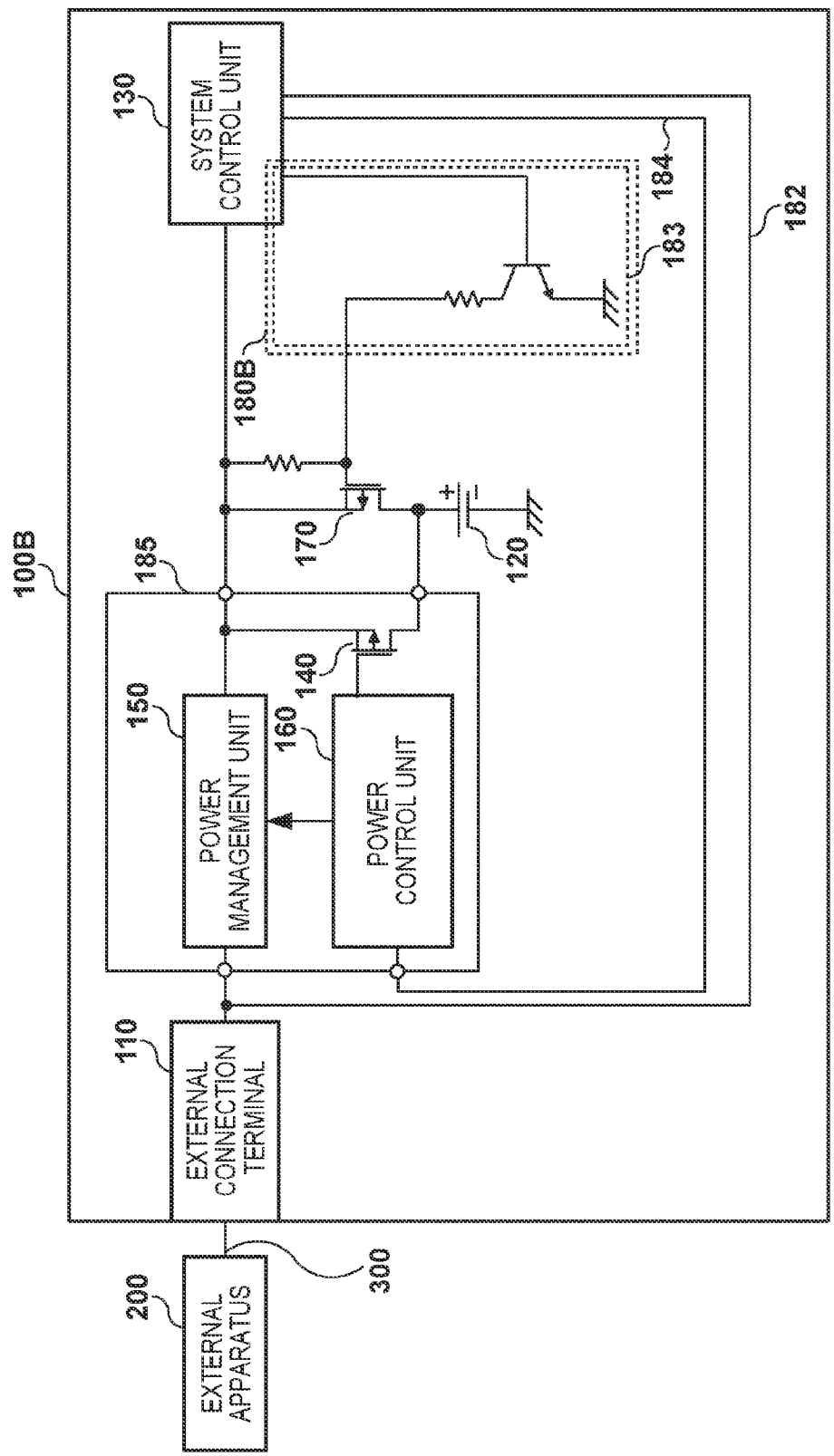
FIG. 6 is a block diagram for illustrating an exemplary configuration of an electronic apparatus 100B according to a second embodiment.

FIG. 6 is a block diagram for illustrating an exemplary configuration of an electronic apparatus 100B according to the second embodiment. Among components of the electronic apparatus 100B, components having functions similar to those of the components of the electronic apparatus 100A will be assigned the same signs, and descriptions thereof will be omitted. Unlike the electronic apparatus 100A, the electronic apparatus 100B has a second switch control unit 180B. Unlike the second switch control unit 180A, the second switch control unit 180B does not have a hardware control unit 181. The electronic apparatus 100B may be an apparatus that has a built-in battery 120, or the electronic apparatus 100B may be an apparatus from which the battery 120 can be removed. The electronic apparatus 100B is an apparatus capable of acting as an image capture apparatus, a mobile device, or a display apparatus, for example. Here, the image capture apparatus includes an apparatus capable of acting as a digital camera or a scanner. The mobile device includes an apparatus capable of acting as a mobile phone. Note that at least one of the components of the electronic apparatus 100B have a hardware configuration.

In FIG. 6, the second switch control unit 180B includes a software control unit 183. The second switch control unit 180B performs control for turning on a second switch circuit 170 in a case where the software control unit 183 performs control for turning on the second switch circuit 170.

Figure 7:
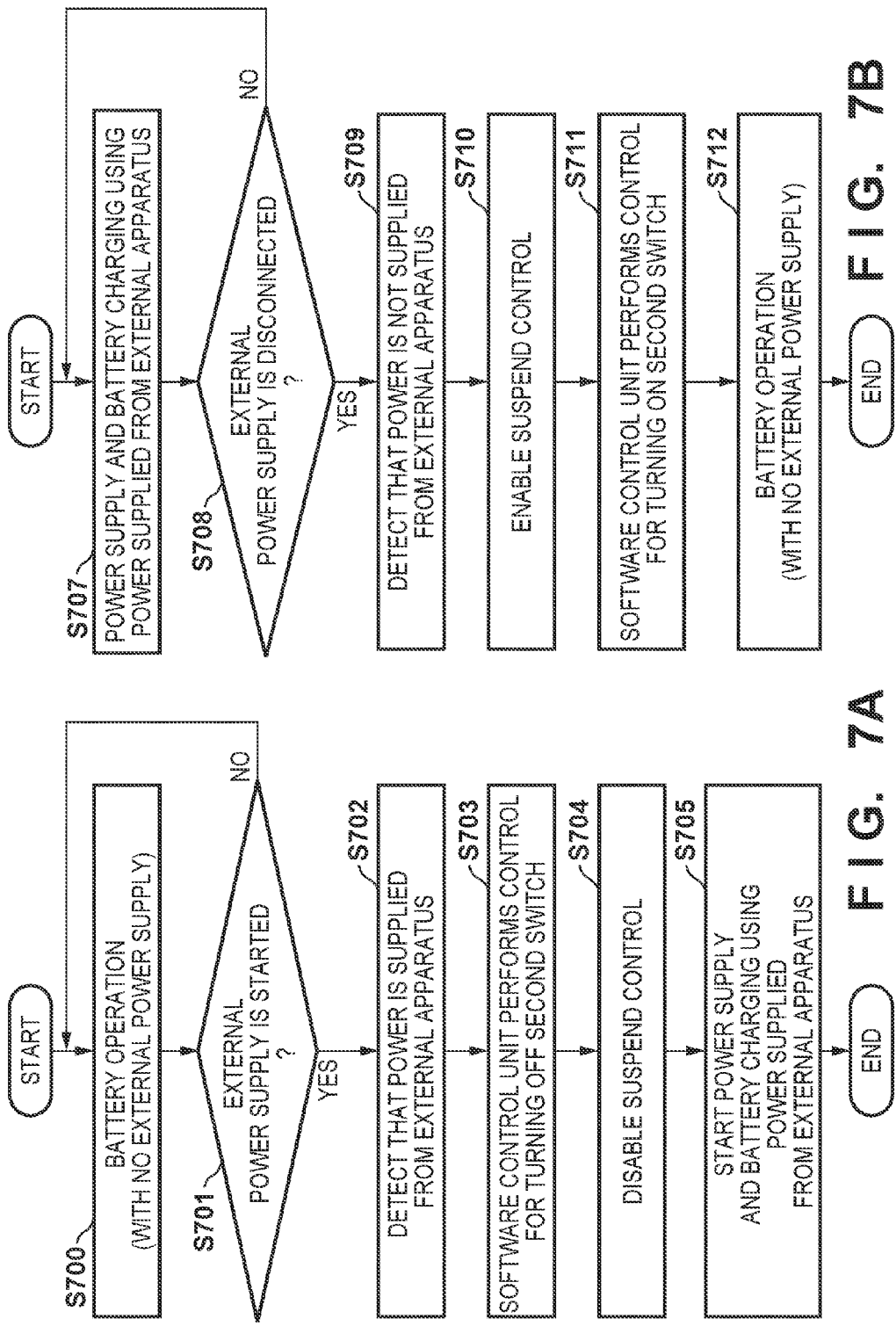
FIGS. 7A and 7B are flowcharts for illustrating processes performed in the electronic apparatus 100B according to the second embodiment.

Next, processes performed in the electronic apparatus 100B according to the second embodiment will be described with reference to FIGS. 7A and 7B. FIG. 7A is a flowchart for illustrating a process performed in the electronic apparatus 100B in a case where power supply from the external apparatus 200 to the electronic apparatus 100B is started. FIG. 7B is a flowchart for illustrating a process performed in the electronic apparatus 100B in a case where the supply of power from the external apparatus 200 to the electronic apparatus 100B is disconnected.

First, a description will be given, with reference to FIG. 7A, of a process performed in the electronic apparatus 100B in a case where power supply from the external apparatus 200 to the electronic apparatus 100B is started.

In step S700, the electronic apparatus 100B enters a battery-operated state when the electronic apparatus 100B is in a state where power is not supplied from the external apparatus 200. Here, the battery-operated state refers to a state where the system control unit 130 can operate with power supplied from the battery 120.

In step S701, if power is supplied from the external apparatus 200 to the electronic apparatus 100B, the process proceeds to step S702. If, in step S701, power is not supplied from the external apparatus 200 to the electronic apparatus 100B, the process returns to step S700, and steps S700 and S701 are repeated until supplying power from the external apparatus 200 to the electronic apparatus 100B is started.

In step S702, the system control unit 130 detects, by using an external power detection signal 182, that power is supplied from the external apparatus 200 to the electronic apparatus 100B.

In step S703, the system control unit 130 controls the software control unit 183 so as to turn off the second switch circuit 170.

In step S704, the system control unit 130 disables the suspend control for a power management unit 150 by using a suspend control signal 184.

In step S705, supplying power to the system control unit 130 and charging the battery 120 are started as a result of power being supplied from the external apparatus 200 to the electronic apparatus 100B.

Next, a description will be given, with reference to FIG. 7B, of a process performed in the electronic apparatus 100B in a case where the supply of power from the external apparatus 200 to the electronic apparatus 100B is disconnected.

In step S707, the electronic apparatus 100B is in a state where power is supplied to the system control unit 130 and the battery 120 is charged as a result of power being supplied from the external apparatus 200.

In step S708, if the supply of power from the external apparatus 200 to the electronic apparatus 100B is disconnected, the process proceeds to step S709. If, in step S708, power is supplied from the external apparatus 200 to the electronic apparatus 100B, the process returns to step S707, and steps S707 and S708 are repeated until the supply of power from the external apparatus 200 to the electronic apparatus 100B is disconnected.

In step S709, the system control unit 130 detects, by using the external power detection signal 182, that power is not supplied from the external apparatus 200 to the electronic apparatus 100B.

In step S710, the system control unit 130 enables the suspend control for the power management unit 150 by using the suspend control signal 184, and stops supplying power to the system control unit 130 and charging the battery 120.

In step S711, the system control unit 130 controls the software control unit 183 so as to turn on the second switch circuit 170.

In step S712, the electronic apparatus 100B enters the battery-operated state when the electronic apparatus 100B is in a state where power is not supplied from the external apparatus 200.

Thus, according to the second embodiment, an increase in the on-resistance of the first switch circuit 140 can be suppressed with a smaller circuit configuration than in the first embodiment, in a case where power is not supplied from the external apparatus 200 to the electronic apparatus 100B and the electronic apparatus 100B is in the battery-operated state. It is thereby possible to reduce a decrease in the voltage supplied to an electrical load of a system (e.g., the system control unit 130) and power loss due to the first switch circuit 140. It is also possible to reduce the possibility that operations of an electrical load of a system (e.g., the system control unit 130) become instable, and to reduce a decrease in the remaining capacity and the operable time of the battery 120.

Third Embodiment

Next, a third embodiment will be described. In the third embodiment, a difference from the first embodiment will be described, and descriptions of features similar to those of the first embodiment will be omitted.

Figure 8:
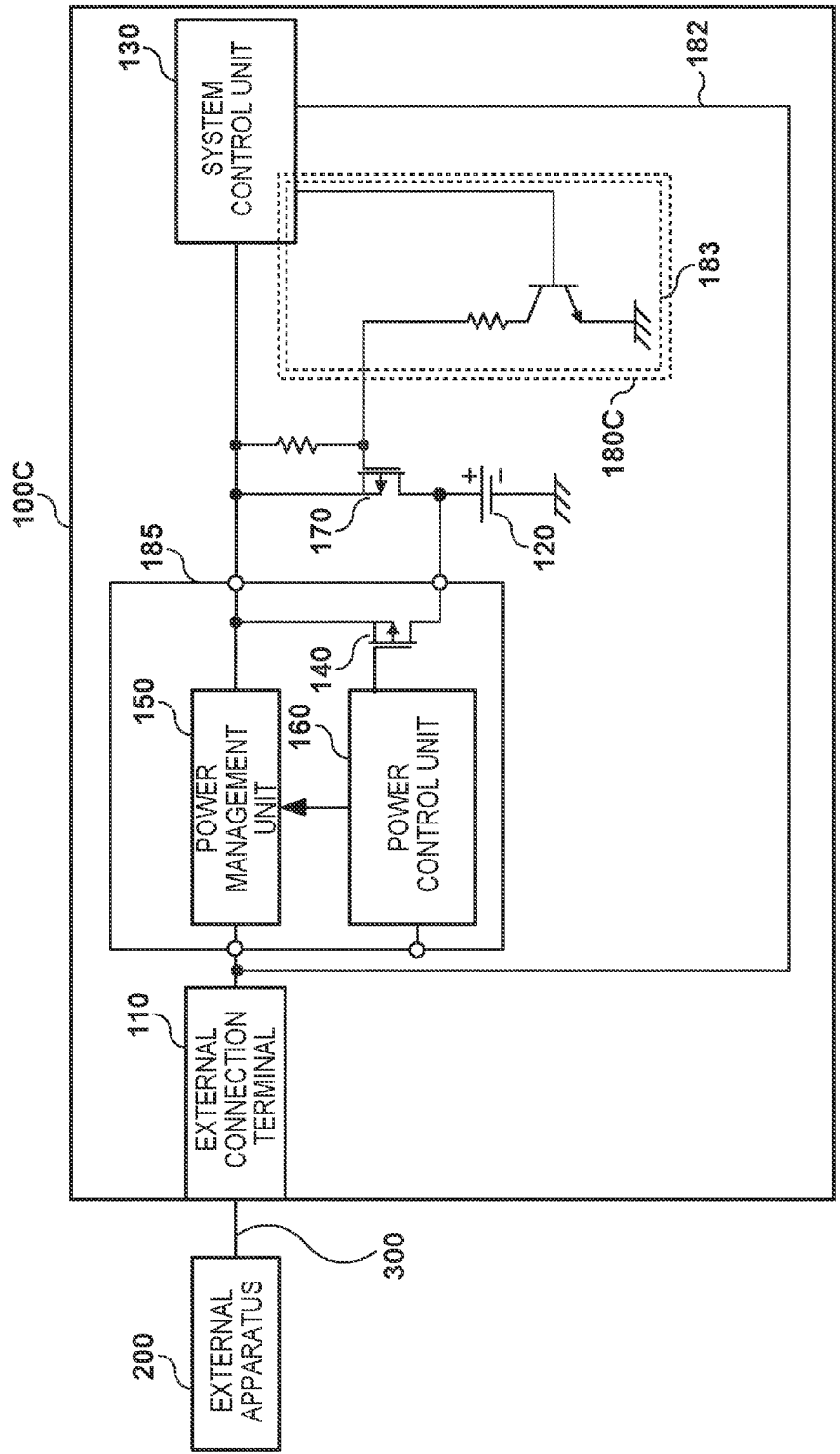
FIG. 8 is a block diagram for illustrating an exemplary configuration of an electronic apparatus 100C according to a third embodiment.

FIG. 8 is a block diagram for illustrating an exemplary configuration of an electronic apparatus 100C according to the third embodiment. Among components of the electronic apparatus 100C, components having functions similar to those of the components of the electronic apparatus 100A will be assigned the same signs, and descriptions thereof will be omitted. Unlike the electronic apparatus 100A, the electronic apparatus 100C has a second switch control unit 180C. Unlike the second switch control unit 180A, the second switch control unit 180C does not have a hardware control unit 181, and is configured not to perform the suspend control. The electronic apparatus 100C may be an apparatus that has a built-in battery 120, or the electronic apparatus 100C may be an apparatus from which the battery 120 can be removed. The electronic apparatus 100C is an apparatus capable of acting as an image capture apparatus, a mobile device, or a display apparatus, for example. Here, the image capture apparatus includes an apparatus capable of acting as a digital camera or a scanner. The mobile device includes an apparatus capable of acting as a mobile phone. Note that at least one of the components of the electronic apparatus 100C have a hardware configuration.

In FIG. 8, the second switch control unit 180C includes a software control unit 183. The second switch control unit 180C performs control for turning on a second switch circuit 170 in a case where the software control unit 183 performs control for turning on the second switch circuit 170.

Figure 9:
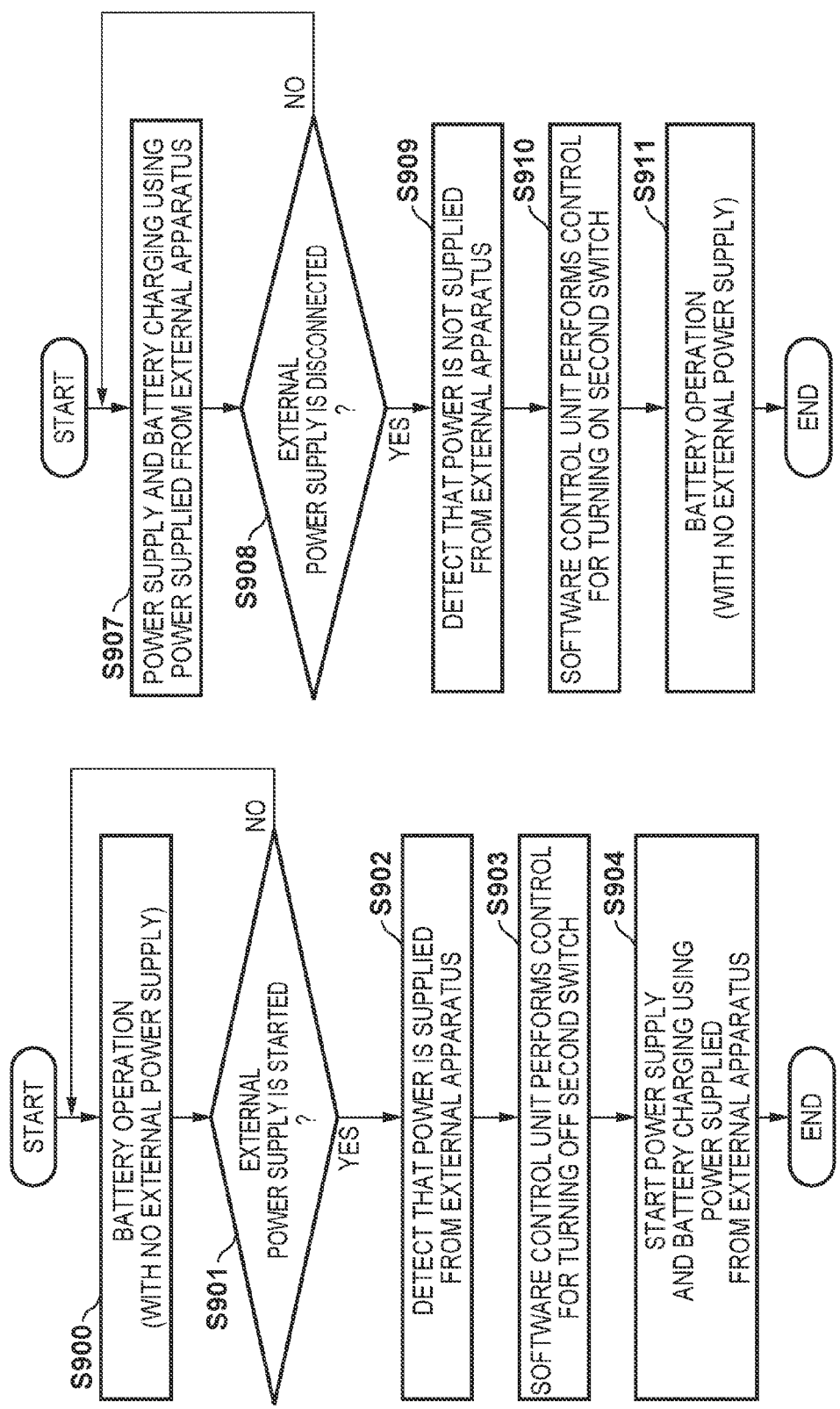
FIGS. 9A and 9B are flowcharts for illustrating processes performed in the electronic apparatus 100C according to the third embodiment.

Next, processes performed in the electronic apparatus 100C according to the third embodiment will be described with reference to FIGS. 9A and 9B. FIG. 9A is a flowchart for illustrating a process performed in the electronic apparatus 100C in a case where power supply from the external apparatus 200 to the electronic apparatus 100C is started. FIG. 9B is a flowchart for illustrating a process performed in the electronic apparatus 100C in a case where the supply of power from the external apparatus 200 to the electronic apparatus 100C is disconnected.

First, a description will be given, with reference to FIG. 9A, of a process performed in the electronic apparatus 100C in a case where supplying power from the external apparatus 200 to the electronic apparatus 100C is started.

In step S900, the electronic apparatus 100C enters a battery-operated state when the electronic apparatus 100C is in a state where power is not supplied from the external apparatus 200. Here, the battery-operated state refers to a state where the system control unit 130 can operate with power supplied from the battery 120.

In step S901, if power is supplied from the external apparatus 200 to the electronic apparatus 100C, the process proceeds to step S902. If, in step S901, power is not supplied from the external apparatus 200 to the electronic apparatus 100C, the process returns to step S900, and steps S900 and S901 are repeated until supplying power from the external apparatus 200 to the electronic apparatus 100C is started.

In step S902, the system control unit 130 detects, by using an external power detection signal 182, that power is supplied from the external apparatus 200 to the electronic apparatus 100C.

In step S903, the system control unit 130 controls the software control unit 183 so as to turn off the second switch circuit 170.

In step S904, supplying power to the system control unit 130 and charging the battery 120 are started as a result of power supplied from the external apparatus 200 to the electronic apparatus 100C.

Next, a description will be given, with reference to FIG. 9B, of a process performed in the electronic apparatus 100C in a case where the supply of power from the external apparatus 200 to the electronic apparatus 100C is disconnected.

In step S907, the electronic apparatus 100C is in a state where power is supplied to the system control unit 130 and the battery 120 is charged as a result of power being supplied from the external apparatus 200.

In step S908, if the supply of power from the external apparatus 200 to the electronic apparatus 100C is disconnected, the process proceeds to step S909. If, in step S908, power is supplied from the external apparatus 200 to the electronic apparatus 100C, the process returns to step S907, and steps S907 and S908 are repeated until the supply of power from the external apparatus 200 to the electronic apparatus 100C is disconnected.

In step S909, the system control unit 130 detects, by using the external power detection signal 182, that power is not supplied from the external apparatus 200 to the electronic apparatus 100C.

In step S910, the system control unit 130 controls the software control unit 183 so as to turn on the second switch circuit 170.

In step S911, the electronic apparatus 100C enters the battery-operated state when the electronic apparatus 100C is in a state where power is not supplied from the external apparatus 200.

Thus, according to the third embodiment, an increase in the on-resistance of the first switch circuit 140 can be suppressed in a case where power is not supplied from the external apparatus 200 to the electronic apparatus 100C and the electronic apparatus 100C is in the battery-operated state. In addition, according to the third embodiment, the suspend control by the system control unit 130 can also be eliminated. It is thereby possible to reduce a decrease in the voltage supplied to an electrical load of a system (e.g., the system control unit 130) and power loss due to the first switch circuit 140. It is also possible to reduce the possibility that operations of an electrical load of a system (e.g., the system control unit 130) become instable, and to reduce a decrease in the remaining capacity and the operable time of the battery 120.

Fourth Embodiment

Next, a fourth embodiment will be described. In the fourth embodiment, a difference from the first embodiment will be described, and descriptions of features similar to those of the first embodiment will be omitted.

Figure 10:
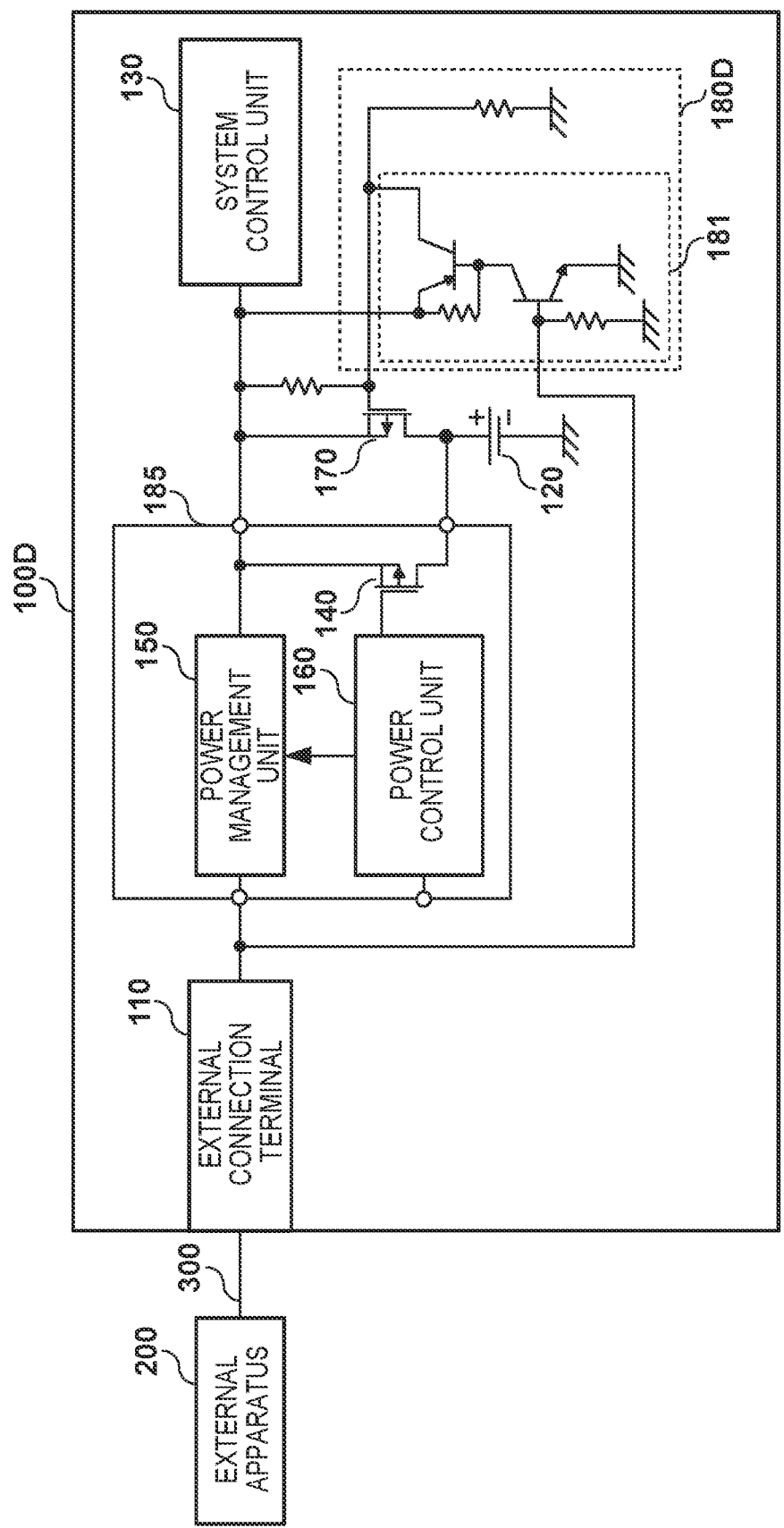
FIG. 10 is a block diagram for illustrating an exemplary configuration of an electronic apparatus 100D according to a fourth embodiment.

FIG. 10 is a block diagram for illustrating an exemplary configuration of an electronic apparatus 100D according to the fourth embodiment. Among components of the electronic apparatus 100D, components having functions similar to those of the components of the electronic apparatus 100A will be assigned the same signs, and descriptions thereof will be omitted. Unlike the electronic apparatus 100A, the electronic apparatus 100D has a second switch control unit 180D. Unlike the second switch control unit 180A, the second switch control unit 180D does not have a software control unit 183, and is configured not to perform the suspend control. The electronic apparatus 100D may be an apparatus that has a built-in battery 120, or the electronic apparatus 100D may be an apparatus from which the battery 120 can be removed. The electronic apparatus 100D is an apparatus capable of acting as an image capture apparatus, a mobile device, or a display apparatus, for example. Here, the image capture apparatus includes an apparatus capable of acting as a digital camera or a scanner. The mobile device includes an apparatus capable of acting as a mobile phone. Note that at least one of the components of the electronic apparatus 100D have a hardware configuration.

In FIG. 10, the second switch control unit 180D includes a hardware control unit 181. In a case where the hardware control unit 181 performs control for turning on the second switch circuit 170, the second switch control unit 180D performs control for turning on the second switch circuit 170.

Figure 11:
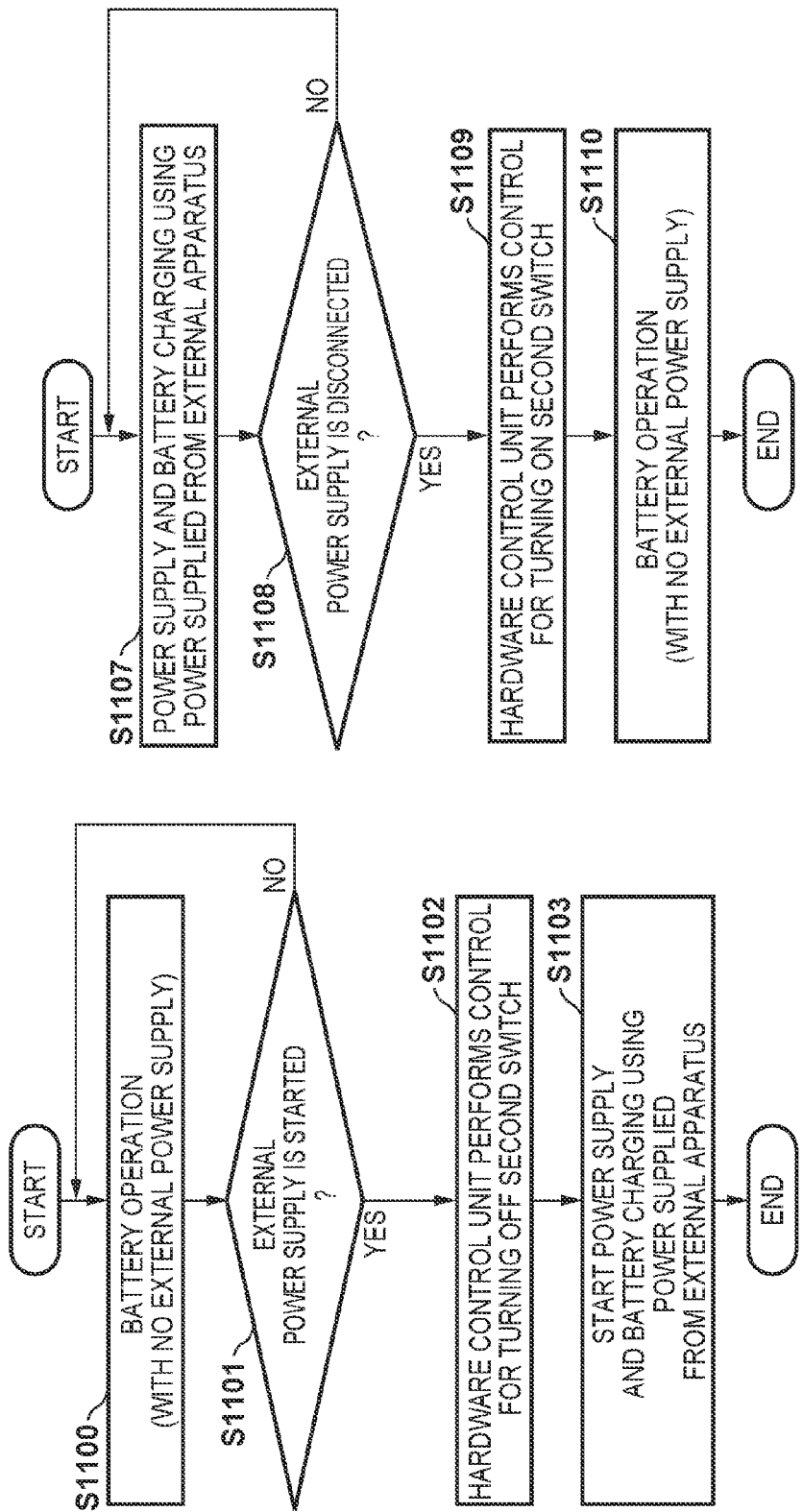
FIGS. 11A and 11B are flowcharts for illustrating processes performed in the electronic apparatus 100D according to the fourth embodiment.

Next, processes performed in the electronic apparatus 100D according to the fourth embodiment will be described with reference to FIGS. 11A and 11B. FIG. 11A is a flowchart for illustrating a process performed in the electronic apparatus 100D in a case where power supply from the external apparatus 200 to the electronic apparatus 100D is started. FIG. 11B is a flowchart for illustrating a process performed in the electronic apparatus 100D in a case where the supply of power from the external apparatus 200 to the electronic apparatus 100D is disconnected.

First, a description will be given, with reference to FIG. 11A, of a process performed in the electronic apparatus 100D in a case where power supply from the external apparatus 200 to the electronic apparatus 100D is started.

In step S1100, the electronic apparatus 100D enters a battery-operated state when the electronic apparatus 100D is in a state where power is not supplied from the external apparatus 200. Here, the battery-operated state refers to a state where the system control unit 130 can operate with power supplied from the battery 120.

In step S1101, if power is supplied from the external apparatus 200 to the electronic apparatus 100D, the process proceeds to step S1102. In step S1101, if power is not supplied from the external apparatus 200 to the electronic apparatus 100D, the process returns to step S1100, and steps S1100 and S1101 are repeated until supplying power from the external apparatus 200 to the electronic apparatus 100D is started.

In step S1102, the hardware control unit 181 performs control for turning off the second switch circuit 170 since power is supplied from the external apparatus 200 to the electronic apparatus 100D.

In step S1103, supplying power to the system control unit 130 and charging the battery 120 are started as a result of power supplied from the external apparatus 200 to the electronic apparatus 100D.

Next, a description will be given, with reference to FIG. 11B, of a process performed in the electronic apparatus 100D in a case where the supply of power from the external apparatus 200 to the electronic apparatus 100D is disconnected.

In step S1107, the electronic apparatus 100D is in a state where power is supplied to the system control unit 130 and the battery 120 is charged as a result of power being supplied from the external apparatus 200.

In step S1108, if the supply of power from the external apparatus 200 to the electronic apparatus 100D is disconnected, the process proceeds to step S1109. In step S1108, if power is supplied from the external apparatus 200 to the electronic apparatus 100D, the process returns to step S1107, and steps S1107 and S1108 are repeated until the supply of power from the external apparatus 200 to the electronic apparatus 100D is disconnected.

In step S1109, the hardware control unit 181 performs control for turning on the second switch circuit 170 since power is not supplied from the external apparatus 200 to the electronic apparatus 100D.

In step S1110, the electronic apparatus 100D enters the battery-operated state when the electronic apparatus 100D is in a state where power is not supplied from the external apparatus 200. Here, the battery-operated state refers to a state where the system control unit 130 can operate with power supplied from the battery 120.

Thus, according to the fourth embodiment, an increase in the on-resistance of the first switch circuit 140 can be suppressed in a case where power is not supplied from the external apparatus 200 to the electronic apparatus 100D and the electronic apparatus 100D is in the battery-operated state. It is thereby possible to reduce a decrease in the voltage supplied to an electrical load of a system (e.g., the system control unit 130) and power loss due to the first switch circuit 140. It is also possible to reduce the possibility that operations of an electrical load of a system (e.g., the system control unit 130) become instable, and to reduce a decrease in the remaining capacity and the operable time of the battery 120.

Fifth Embodiment

Next, a fifth embodiment will be described. In the fifth embodiment, a difference from the first embodiment will be described, and descriptions of features similar to those of the first embodiment will be omitted.

Figure 12:
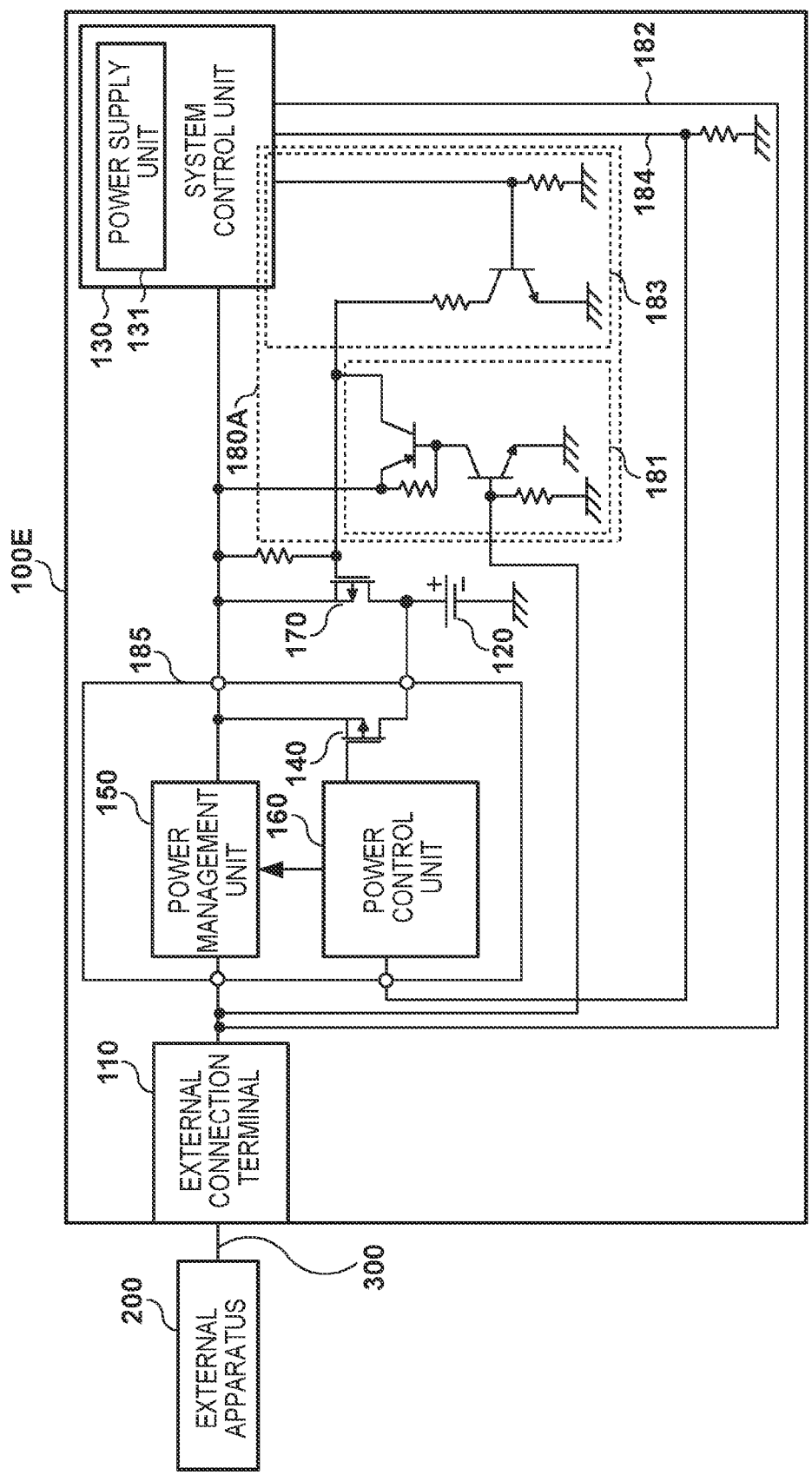
FIG. 12 is a block diagram for illustrating an exemplary configuration of an electronic apparatus 100E according to a fifth embodiment.

FIG. 12 is a block diagram for illustrating an exemplary configuration of an electronic apparatus 100E according to the fifth embodiment. Among components of the electronic apparatus 100E, components having functions similar to those of the components of the electronic apparatus 100A will be assigned the same signs, and descriptions thereof will be omitted. In the electronic apparatus 100E, the system control unit 130 has a power source unit 131, unlike the electronic apparatus 100A. The power source unit 131 may be included in the system control unit 130, or may be an external unit attached to the system control unit 130. The electronic apparatus 100E may be an apparatus that has a built-in battery 120, or the electronic apparatus 100E may be an apparatus from which the battery 120 can be removed. The electronic apparatus 100E is an apparatus capable of acting as an image capture apparatus, a mobile device, or a display apparatus, for example. Here, the image capture apparatus includes an apparatus capable of acting as a digital camera or a scanner. The mobile device includes an apparatus capable of acting as a mobile phone. Note that at least one of the components of the electronic apparatus 100E have a hardware configuration.

The power source unit 131 can be charged by both power from the battery 120 and power supplied from the external apparatus 200 to the electronic apparatus 100E. The power source unit 131 can supply power of a predetermined voltage to the system control unit 130 and other components for a predetermined time period based on an instruction from a power switch that the electronic apparatus 100E has. The system control unit 130 can detect whether or not power is supplied from the external apparatus 200 based on a signal level at an input port to which an external power detection signal 182 is input. The system control unit 130 can perform the suspend control for stopping supplying power to the power source unit 131 and charging the battery 120, by switching output of a suspend control signal 184. The details of the suspend control are as described with reference to FIGS. 5A and 5B.

In the fifth embodiment, if the signal from the system control unit 130 is at a logical-high level, the power management unit 150 stops supplying power to the system control unit 130 and charging the battery 120. If the signal from the system control unit 130 is at a logical-low level, the power management unit 150 can supply power to the system control unit 130 and charge the battery 120. In a case where the signal from the system control unit 130 is indefinite, the power management unit 150 can supply power to the system control unit 130 and charge the battery 120.

In a case where the signal from the system control unit 130 is at a logical-high level, the software control unit 183 can turn on the second switch circuit 170, and in a case where the signal from the system control unit 130 is at a logical-low level, the software control unit 183 can turn off the second switch circuit 170. In a case where the signal from the system control unit 130 is indefinite, the software control unit 183 can turn off the second switch circuit 170. Thus, in a case where the system control unit 130 is in an inactive state, the software control unit 183 turns off the second switch circuit 170.

In a case where the system control unit 130 receives power supplied from the external apparatus 200 and is active, the system control unit 130 can detect whether or not power is supplied from the external apparatus 200 to the electronic apparatus 100E. In a case where the system control unit 130 is active, the software control unit 183 turns on the second switch circuit 170 in a case where power is not supplied from the external apparatus 200, and turns off the second switch circuit 170 in a case where power is supplied from the external apparatus 200.

Note that processes performed in a case where the system control unit 130 is active are similar to the processes described with reference to FIGS. 3A and 3B.

Although the fifth embodiment describes the case where the software control unit 183 includes a bipolar transistor, the fifth embodiment is not limited thereto. In the fifth embodiment, the software control unit 183 may include a MOSFET or the like, for example.

Next, a description will be given, with reference to FIG. 13, of a process performed in the electronic apparatus 100E in a case where the system control unit 130 according to the fifth embodiment is inactive.

In step S1301, power is not supplied from the external apparatus 200 to the electronic apparatus 100E, and the system control unit 130 is in an inactive state of not being capable of detecting whether or not power is supplied from the external apparatus 200. Since power is not supplied from the external apparatus 200 to the electronic apparatus 100E, the hardware control unit 181 performs control for turning on the second switch circuit 170. Since the system control unit 130 is inactive, the software control unit 183 performs control for turning off the second switch circuit 170. As in the first embodiment, the second switch circuit 170 turns on in a case where both the hardware control unit 181 and the software control unit 183 perform control for turning on the second switch circuit 170, and the second switch circuit 170 turns off in a case where other control is performed. Accordingly, in step S1301, the second switch circuit 170 is controlled so as to be turned off. In addition, since the system control unit 130 is in the inactive state, the suspend control for the power management unit 150 is disabled. Accordingly, the power management unit 150 can supply power to the system control unit 130 and charge the battery 120.

If, in step S1302, power is supplied from the external apparatus 200 to the electronic apparatus 100E, the process proceeds to step S1303, and if power is not supplied, the process returns to step S1301, and steps S1301 and S1302 are repeated until power is supplied.

In step S1303, the hardware control unit 181 performs control for turning off the second switch circuit 170 since power is supplied from the external apparatus 200 to the electronic apparatus 100E. Meanwhile, in step S1301, the second switch circuit 170 is controlled so as to be turned off by the software control unit 183. It is thereby possible to prevent the second switch circuit 170 from turning on at a timing other than a desired timing due to delay or malfunction in off-control of the hardware control unit 181. Thus, even in a case where power is not supplied from the external apparatus 200, the software control unit 183 can turn off the second switch circuit 170 if the signal from the system control unit 130 is indefinite.

In step S1304, the battery 120 is charged by the power management unit 150, the power control unit 160, and the first switch circuit 140. The power source unit 131 of the system control unit 130 enters a standby state of being capable of supplying power of a predetermined voltage to the system control unit 130 and other components for a predetermined time period by using power supplied from the external apparatus 200 based on an instruction from a power switch that the electronic apparatus 100E has.

In step S1305, if the supply of power from the external apparatus 200 is disconnected, the process proceeds to step S1306, and if power is supplied, the process returns to step S1304 and steps S1304 and S1305 are repeated until the supply of power is disconnected.

In step S1306, the hardware control unit 181 performs control for turning on the second switch circuit 170 since power is not supplied from the external apparatus 200 to the electronic apparatus 100E. Meanwhile, control for turning off the second switch circuit 170 is continued by the software control unit 183.

In step S1307, since power is not supplied from the external apparatus 200 to the electronic apparatus 100E, the power management unit 150 stops supplying power to the system control unit 130 and charging the battery 120. However, if power is supplied from the external apparatus 200, the system control unit 130 is in the inactive state, and therefore the power management unit 150 can supply power to the system control unit 130 and charge the battery 120.

Thus, according to the fifth embodiment, even if the system control unit 130 is in the inactive state, the electronic apparatus 100E can turn off the second switch circuit 170 by using the software control unit 183. It is thereby possible to prevent the second switch circuit 170 from turning on at a timing other than a desired timing due to delay or malfunction in off-control of the hardware control unit 181.

In addition, according to the fifth embodiment, an increase in the on-resistance of the first switch circuit 140 can be suppressed in a case where power is not supplied from the external apparatus 200 to the electronic apparatus 100E and the electronic apparatus 100E is in the battery-operated state. It is thereby possible to reduce a decrease in the voltage supplied to an electrical load of a system (e.g., the system control unit 130) and power loss due to the first switch circuit 140. It is also possible to reduce the possibility that operations of an electrical load of a system (e.g., the system control unit 130) become instable, and to reduce a decrease in the remaining capacity and the operable time of the battery 120.

Sixth Embodiment

Various kinds of functions, processes, and methods described in the first to fifth embodiments can also be achieved by a personal computer, a microcomputer, a CPU (Central Processing Unit), or the like using a program. In a sixth embodiment, a personal computer, a microcomputer, a CPU, or the like will be called a "computer X" below. Furthermore, in the sixth embodiment, a program for controlling the computer X and achieving various kinds of functions, processes, and methods described in the first to fifth embodiments will be called a "program Y".

Various kinds of functions, processes, and methods described in the first to fifth embodiments are achieved by the computer X executing the program Y. In this case, the program Y is supplied to the computer X via a computer-readable storage medium. The computer-readable storage medium according to the sixth embodiment includes at least one of a hard disk device, a magnetic storage device, an optical storage device, a magneto-optical storage device, a memory card, a ROM, a RAM, and the like. The computer-readable storage medium according to the sixth embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2014-247440, filed Dec. 5, 2014, which is hereby incorporated by reference herein in its entirety.

What is claimed is:

1. An electronic apparatus comprising:
   a first switch unit configured to be connected between an electrical load and a battery;
   a second switch unit configured to be connected between the electrical load and the battery, and configured to be connected in parallel with the first switch unit;
   a first control unit that controls the first switch unit to charge the battery with a first power supplied from an external apparatus to the electronic apparatus; and
   a second control unit that controls the second switch unit based on whether the first power is supplied from the external apparatus to the electronic apparatus,
   wherein in a case where the first power is not supplied from the external apparatus to the electronic apparatus, the second control unit controls the second switch unit to supply a second power from the battery to the electrical load via the second switch unit.

2. The electronic apparatus according to claim 1, wherein in a case where the first power is not supplied from the external apparatus to the electronic apparatus, the second control unit controls the second switch unit to enter an on state.

3. The electronic apparatus according to claim 1, wherein in a case where the first power is supplied from the external apparatus to the electronic apparatus, the second control unit controls the second switch unit to enter an off state.

4. The electronic apparatus according to claim 1, wherein in a case where the first power is not supplied from the external apparatus to the electronic apparatus, the second control unit controls the second switch unit to enter an on state, and
   wherein in a case where the first power is supplied from the external apparatus to the electronic apparatus, the second control unit controls the second switch unit to enter an off state.

5. The electronic apparatus according to claim 1, wherein the second control unit includes a software controller and a hardware controller.

6. The electronic apparatus according to claim 1, wherein the second switch unit includes a MOSFET, a bipolar transistor, or an analog switch.

7. The electronic apparatus according to claim 1, wherein the electronic apparatus is capable of acting as an image capture apparatus, a mobile device, or a display apparatus.

8. A method comprising:
   controlling a first switch unit to charge a battery with a first power supplied from an external apparatus to an electronic apparatus, the first switch unit being configured to be connected between an electrical load and the battery; and
   controlling a second switch unit based on whether the first power is supplied from the external apparatus to the electronic apparatus, the second switch unit being configured to be connected between the electrical load and the battery, and configured to be connected in parallel with the first switch unit,
   wherein in a case where the first power is not supplied from the external apparatus to the electronic apparatus, the second switch unit is controlled to supply a second power from the battery to the pg,50 electrical load via the second switch unit.

9. The method according to claim 8, wherein in a case where the first power is not supplied from the external apparatus to the electronic apparatus, the second switch unit is controlled to enter an on state.

10. The method according to claim 8, wherein in a case where the first power is supplied from the external apparatus to the electronic apparatus, the second switch unit is controlled to enter an off state.

11. The method according to claim 8, wherein in a case where the first power is not supplied from the external apparatus to the electronic apparatus, the second switch unit is controlled to enter an on state, and
    wherein in a case where the first power is supplied from the external apparatus to the electronic apparatus, the second switch unit is controlled to enter an off state.

12. The method according to claim 8, wherein the second control unit includes a software controller and a hardware controller.

13. The method according to claim 8, wherein the second switch unit includes a MOSFET, a bipolar transistor, or an analog switch.

14. The method according to claim 8, wherein the electronic apparatus is capable of acting as an image capture apparatus, a mobile device, or a display apparatus.

15. A non-transitory storage medium that stores a program for causing a computer to execute a method, the method comprising:
    controlling a first switch unit to charge a battery with a first power supplied from an external apparatus to an electronic apparatus, the first switch unit being configured to be connected between an electrical load and the battery; and controlling a second switch unit based on whether the first power is supplied from the external apparatus to the electronic apparatus, the second switch unit being configured to be connected between the electrical load and the battery, and configured to be connected in parallel with the first switch unit, wherein in a case where the first power is not supplied from the external apparatus to the electronic apparatus, the second switch unit is controlled to supply a second power from the battery to the electrical load via the second switch unit.

16. An electronic apparatus comprising:

a first switch unit configured to be connected between an electrical load and a battery;

a second switch unit configured to be connected between the electrical load and the battery, and configured to be connected in parallel with the first switch unit;

a first control unit that controls the first switch unit to supply a second power from the battery to the electrical load in a case where a first power is not supplied front an external apparatus to the electronic apparatus, and controls the first switch unit to charge the battery with the first power supplied from the external apparatus to the electronic apparatus in a case where the first power is supplied from the external apparatus to the electronic apparatus; and a second control unit that controls the second switch unit based on whether the first power is supplied from the external apparatus to the electronic apparatus, wherein in a case where the first power is not supplied from the external apparatus to the electronic apparatus, the second control unit controls the second switch unit supply the second power from the battery to the electrical load via the second switch unit.

17. The electronic apparatus according to claim 16, wherein in case where the first power is not supplied from the external apparatus to the electronic apparatus, the second control unit controls the second switch unit to enter an on state.

18. The electronic apparatus according to claim 17, wherein in a case where the first power is supplied from the external apparatus to the electronic apparatus, the second control unit controls the second switch unit to enter an off state.

19. The electronic apparatus according to claim 16, wherein in a case where the first power is not supplied from the external apparatus to the electronic apparatus, the second control unit controls the seconds switch unit to enter an on state, and wherein in a case where the first power is supplied from the external apparatus to the electronic apparatus, the second control unit controls the second switch unit to enter an off state.

20. The electronic apparatus according to claim 16, wherein the second control unit includes a software controller and a hardware controller.

21. The electronic apparatus according to claim 16, wherein the second switch unit includes a MOSFET, a bipolar transistor, or an analog switch.

22. The electronic apparatus according to claim 16, wherein the electronic apparatus is capable of acting as an image capture apparatus, a mobile device, or a display apparatus.

23. A method comprising:

controlling a first switch unit to supply a second power from a battery to an electrical load in an electronic apparatus in a case where a first power is not supplied from an external apparatus to the electronic apparatus, and controlling the first switch unit to charge the battery with the first power supplied from the external apparatus to the electronic apparatus in a case where the first power is supplied from the external apparatus to the electronic apparatus, the first switch unit being configured to be connected between the electrical load and the battery; and controlling a second switch unit based on whether the first power is supplied from the external apparatus to the electronic apparatus, the second switch unit being configured to be connected between the electrical load and the battery, and configured to be connected in parallel with the first switch unit, wherein in a case where the first power is not supplied from the external apparatus to the electronic apparatus, the second switch unit is controlled to supply the second power from the battery to the electrical load via the second switch unit.

24. The method according to claim 23, wherein in a case where the first power is not supplied from the external apparatus to the electronic apparatus, the second switch unit is controlled to enter an on state.

25. The method according to claim 23, wherein in a case where the first power is supplied from the external apparatus to the electronic apparatus, the second switch unit is controlled to enter an off state.

26. The method according to claim 23, wherein in a case where the first power is not supplied from the external apparatus to the electronic apparatus, the second switch unit is controlled to enter an on state, and wherein in a case where the first power is supplied from the external apparatus to the electronic apparatus, the second switch unit is controlled to enter an off state.

27. The method according to claim 23, wherein the second control unit includes a software controller and a hardware controller.

28. The method according to claim 23, wherein the second switch unit includes a MOSFET, a bipolar transistor, or an analog switch.

29. The method according to claim 23, wherein the electronic apparatus is capable of acting as an image capture apparatus, a mobile device, or a display apparatus.

30. A non-transitory storage medium that stores a program for causing a computer to execute a method, the method comprising:

controlling a first switch unit to supply a second power from a battery to an electrical load in an electronic apparatus in a case where a first power is not supplied from an external apparatus to the electronic apparatus, and controlling the first switch unit to charge the battery with the first power supplied from the external apparatus to the electronic apparatus in a case where the first power is supplied from the external apparatus to the electronic apparatus, the first switch unit being configured to be connected between the electrical load and the battery, and controlling a second switch unit based on whether the first power is supplied from the external apparatus to the electronic apparatus, the second switch unit being configured to be connected between the electrical load and the battery, and configured to be connected in parallel with the first switch unit, wherein in a case where the first power is not supplied from the external apparatus to the electronic apparatus, the second switch unit is controlled to supply the second power from the battery to the electrical load via the second switch unit.

\* \* \* \* \*